United States Patent
Ren et al.

(10) Patent No.: US 11,134,498 B2
(45) Date of Patent: Sep. 28, 2021

(54) COVERAGE MODE IDENTIFICATION METHOD AND APPARATUS

(71) Applicant: HUAWEI TECHNOLOGIES CO., LTD., Guangdong (CN)

(72) Inventors: Zhanyang Ren, Madrid (ES); Zhijun Li, Beijing (CN); Jinxia Han, Beijing (CN); Zhenyu Li, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/657,636

(22) Filed: Oct. 18, 2019

(65) Prior Publication Data
US 2020/0053720 A1    Feb. 13, 2020

Related U.S. Application Data

(63) Continuation of application No. PCT/CN2017/081151, filed on Apr. 19, 2017.

(51) Int. Cl.
*H04W 72/04* (2009.01)
*H04W 16/26* (2009.01)
*H04W 52/36* (2009.01)

(52) U.S. Cl.
CPC ......... *H04W 72/048* (2013.01); *H04W 16/26* (2013.01); *H04W 52/36* (2013.01); *H04W 72/0413* (2013.01)

(58) Field of Classification Search
CPC ... H04W 72/048; H04W 16/26; H04W 52/36; H04W 72/0413
See application file for complete search history.

(56) References Cited

U.S. PATENT DOCUMENTS

2015/0016312 A1   1/2015   Li et al.
2015/0117410 A1*  4/2015   Wu ........................... H04L 1/08
                                                              370/331
(Continued)

FOREIGN PATENT DOCUMENTS

CN    101336003 A    12/2008
CN    103458528 A    12/2013
(Continued)

OTHER PUBLICATIONS

Ericsson, "Remaining issues on random access for Rei-13 low complexity and enhanced coverage UE5",3GPP Draft; R2-156774, XP051040424,Nov. 16, 2015,12 pages (Year: 2015).*

(Continued)

*Primary Examiner* — Joshua L Schwartz
(74) *Attorney, Agent, or Firm* — Fish & Richardson P.C.

(57) ABSTRACT

Example coverage mode identification methods and apparatus are described. One example method includes determining a first coverage mode by a terminal. The terminal determines a preamble sequence based on the first coverage mode, and sends the preamble sequence to a base station, where the preamble sequence is used to determine the first coverage mode. Because the base station can determine the coverage mode of the terminal by using only the preamble sequence sent by the terminal, without using a channel used to receive a signal of the terminal, resources do not need to be grouped or planned, and there is no need to strictly distinguish between different coverage mode sets or groups.

14 Claims, 7 Drawing Sheets

(56) References Cited

U.S. PATENT DOCUMENTS

| | | |
|---|---|---|
| 2015/0296539 A1 | 10/2015 | Guo et al. |
| 2016/0150570 A1 | 5/2016 | Wang et al. |
| 2016/0234864 A1 | 8/2016 | Guo et al. |
| 2016/0255591 A1 | 9/2016 | Park et al. |
| 2016/0286580 A1 | 9/2016 | Liu et al. |
| 2016/0295609 A1 | 10/2016 | Vajapeyam et al. |
| 2016/0323917 A1 | 11/2016 | Hwang et al. |
| 2017/0105127 A1 | 4/2017 | Xiong et al. |
| 2017/0141833 A1* | 5/2017 | Kim ............... H04L 1/0029 |

FOREIGN PATENT DOCUMENTS

| | | | |
|---|---|---|---|
| CN | 103906260 A | 7/2014 | |
| CN | 103906261 A | 7/2014 | |
| CN | 104254135 A | 12/2014 | |
| CN | 104812084 A | 7/2015 | |
| CN | 105379336 A | 3/2016 | |
| CN | 105874726 A | 8/2016 | |
| EP | 3091674 A4 | 8/2017 | |
| JP | 2016526836 A | 9/2016 | |
| WO | 2016047106 A1 | 3/2016 | |
| WO | WO-2016117981 A1 * | 7/2016 | ........ H04B 7/0626 |

OTHER PUBLICATIONS

MFA TS 36.211 V1.0.0 (Nov. 2016), "MulteFire Alliance; Evolved Universal Terrestrial Radio Access (E-UTRA); Physical Channels and Modulation (Release 1)," Nov. 2016, 190 pages.

PCT International Search Report and Written Opinion issued in International Application No. PCT/CN2017/081151 dated Jan. 18, 2018, 15 pages (with English translation).

Qualcomm, "Wideband CE—Procedures for switching between CE and non CE modes," MFA RWG Meeting 10, New Jersey, USA, Apr. 2017, 9 pages.

Ericsson, "Remaining issues on random access for Rel-13 low complexity and enhanced coverage UE5",3GPP Draft; R2-156774, XP051040424,Nov. 16, 2015,12 pages.

Huawei et al., "On PRACH resource indication and level determination during random access",3GPP Draft; R1-156446,XP051002908,Nov. 15, 2015, 6 pages.

Extended European Search Report issued in European Application No. 17906756.6 dated Mar. 23, 2020, 10 pages.

Intel Corporation, "Further details on random access procedure for MTC," 3GPP TSG RAN WG1 Meeting #82bis, R1-155303, Malmo, Sweden, Oct. 5-9, 2015, 8 pages.

Office Action issued in Japanese Application No. 2019-556822 dated Jan. 5, 2021, 6 pages (English translation).

Office Action issued in Chinese Application No. 201780089626.6 dated Sep. 24, 2020, 24 pages (with English translation).

* cited by examiner

COVERAGE MODE IDENTIFICATION METHOD AND APPARATUS

CROSS-REFERENCE TO RELATED APPLICATIONS

This application is a continuation of International Application No. PCT/CN2017/081151, filed on Apr. 19, 2017. The disclosure of which is hereby incorporated by reference in its entirety.

TECHNICAL FIELD

The present invention relates to the communications field, and in particular, to a coverage mode identification method and an apparatus.

BACKGROUND

An MF (MulteFire) system is a wireless communications system that independently works on an unlicensed spectrum, and standardization of the Release 1.0 has been completed currently. Through deployment of the MF system, various operators and service providers may independently and flexibly deploy, without a spectrum constraint, a public or private wireless network on the unlicensed spectrum, to provide various types of wireless network services.

When the MF system is deployed in a scenario such as a harbor, a wharf, and an automated production flow, user equipment usually features relatively high mobility, and during movement of the user equipment, a radio signal sent by a base station is prone to be blocked by various objects between the user equipment and the base station. Consequently, quality of the radio signal is relatively poor, and the user equipment may be unable to normally receive the radio signal. In addition, there is a relatively large quantity of user equipments, and during movement, radio signals of the user equipments are prone to be blocked by each other. Consequently, the user equipment may be unable to normally receive data sent by the base station. In this case, there is a high requirement for quality of a signal delivered by the base station, and the base station needs to provide a better radio coverage capability to respond to a scenario of relatively poor radio signal quality.

Currently, in the R12/13 standard in a Long Term Evolution LTE technology, an "enhanced coverage mode" is introduced, and different coverage modes are graded. To distinguish between and identify coverage modes required by terminals accessing a cell, channel resources are planned together, to respectively map to different coverage modes. The coverage modes of the terminals are distinguished from each other by using resources occupied by the terminals, so that different processing is performed, based on different coverage modes, on the terminals in the different signal coverage modes.

However, in the R12/13 standard in LTE, channel resources corresponding to different coverage modes cannot be multiplexed, and the resources need to be grouped and planned, to strictly distinguish between different coverage mode sets or groups. Therefore, relatively high resource occupation is caused.

SUMMARY

Embodiments of the present invention provide a coverage mode identification method and an apparatus, which are used by a base station to identify a coverage mode of a terminal based on a preamble sequence.

In view of this, a first aspect of this application provides a coverage mode identification method, where the method includes the following content:

A terminal determines a first coverage mode. Optionally, the first coverage mode is an enhanced coverage mode or a normal coverage mode. Specifically, the terminal receives a preset reference signal received power range sent by a base station; the terminal detects reference signal received power of a signal from the base station; and if the reference signal received power falls within the preset reference signal received power range, the terminal determines that the first coverage mode is the normal coverage mode; or if the reference signal received power falls out of the preset reference signal received power range, the terminal determines that the first coverage mode is the enhanced coverage mode. The preset reference signal received power range may include one threshold. A value greater than or equal to the threshold or a value greater than the threshold is considered to fall within the preset reference signal received power range. A value less than the threshold or a value less than or equal to the threshold may be considered to fall out of the preset reference signal received power range. For example, if the threshold is a, all values greater than or equal to a fall within the preset reference signal received power range, and all values less than a fall out of the preset reference signal received power range. Alternatively, all values greater than a fall within the preset reference signal received power range, and all values less than or equal to a fall out of the preset reference signal received power range. This is not limited herein. The preset reference signal received power range is used by the terminal to determine the required first coverage mode, and the terminal may first detect the reference signal received power (Reference Signal Received Power, RSRP) of the signal from the base station. It should be noted that there is no time sequence relationship between steps, performed by the terminal, of receiving the preset reference signal received power range and detecting the reference signal received power of the signal from the base station. To be specific, the terminal may receive the preset reference signal received power range before detecting the reference signal received power of the signal from the base station or after detecting the reference signal received power of the signal from the base station. This is not limited herein.

The terminal determines a preamble sequence based on the first coverage mode. Specifically, to align with LTE, an MF system defines only the first 64 preamble sequences in preamble sequences. Preamble sequences after the 64 preamble sequences are referred to as "redundant" preamble sequences. Herein, the preamble sequences that are not defined in a standard may be defined as preamble sequences used by an "enhanced coverage user", so that the base station may identify an "enhanced coverage mode" of the user in a user access process.

The terminal sends the preamble sequence to the base station, where an index number of the preamble sequence is used to indicate the first coverage mode. In this embodiment of the present invention, after determining the preamble sequence, the terminal may send the preamble sequence to the base station. In this embodiment of the present invention, the terminal may determine a channel resource based on the channel resource configuration information, and then send the preamble sequence to the base station by using the channel resource. Specifically, the channel resource configuration information includes subframe information, frequency domain resource information, and a root sequence index that are of a channel. This is not limited herein.

In this embodiment of the present invention, the base station identifies, based on the preamble sequence, the first coverage mode required by the terminal, without using a channel used to receive a signal of the terminal, so that channel resources can be multiplexed, thereby reducing resource consumption.

With reference to the first aspect of the embodiments of this application, in a first implementation of the first aspect of the embodiments of this application, the method includes:

determining, by the terminal, a first preamble sequence group based on the first coverage mode; and determining, by the terminal, the preamble sequence from the first preamble sequence group.

With reference to the first aspect of the embodiments of this application, in a second implementation of the first aspect of the embodiments of this application, the method includes:

receiving, by the terminal, system information broadcast by the base station; and the determining, by the terminal, a preamble sequence based on the first coverage mode includes: determining, by the terminal, the preamble sequence based on the system information and the first coverage mode.

A second aspect of this application provides a coverage mode identification method, including:

receiving, by a base station, a preamble sequence sent by a terminal, where the preamble sequence is used to indicate a first coverage mode, and the first coverage mode is used to indicate a coverage mode required by the terminal; and determining, by the base station, the first coverage mode based on an index number of the preamble sequence.

Optionally, the first coverage mode is an enhanced coverage mode or a normal coverage mode.

With reference to the second aspect of the embodiments of this application, in a first implementation of the second aspect of the embodiments of this application, the method includes:

sending, by the base station, a preset reference signal received power range to the terminal, where the preset reference signal received power range is used by the terminal to determine the coverage mode.

With reference to the second aspect of the embodiments of this application, in a second implementation of the second aspect of the embodiments of this application, the method includes:

sending, by the base station, system information to the terminal, where the system information is used to indicate a preamble sequence corresponding to the first coverage mode.

A third aspect of this application provides a terminal, including:

a first determining module, configured to determine a first coverage mode; a second determining module, configured to determine a preamble sequence based on the first coverage mode; and a sending module, configured to send the preamble sequence to a base station, where an index number of the preamble sequence is used to indicate the first coverage mode.

Optionally, the first determining module includes:

a first receiving submodule, configured to receive a preset reference signal received power range sent by the base station; a detection submodule, configured to detect reference signal received power of a signal from the base station; and a first determining submodule, configured to: if the reference signal received power falls within the preset reference signal received power range, determine that the first coverage mode is a normal coverage mode; or if the reference signal received power falls out of the preset reference signal received power range, determine that the first coverage mode is an enhanced coverage mode.

Optionally, the second determining module includes:

a second determining submodule, configured to determine a first preamble sequence group based on the first coverage mode; and a third determining submodule, configured to determine the preamble sequence from the first preamble sequence group.

Optionally, the terminal further includes:

a receiving module, configured to receive system information broadcast by the base station.

Optionally, the second determining module includes:

a fourth determining submodule, configured to determine the preamble sequence based on the system information and the first coverage mode.

A fourth aspect of this application provides a base station, including:

a receiving module, configured to receive a preamble sequence sent by a terminal, where the preamble sequence is used to indicate a first coverage mode, and the first coverage mode is used to indicate a coverage mode required by the terminal; and a determining module, configured to determine the first coverage mode based on an index number of the preamble sequence.

Optionally, the base station further includes:

a sending module, configured to send a preset reference signal received power range to the terminal, where the preset reference signal received power range is used by the terminal to determine the coverage mode.

Optionally, the determining module includes:

a sending submodule, configured to send system information to the terminal, so that the terminal determines the preamble sequence based on the system information and the first coverage mode.

A fifth aspect of this application provides a terminal, including:

a transceiver, a memory, a processor, and a bus, where the transceiver, the memory, and the processor are connected by using the bus; the processor is configured to: determine a first coverage mode, and determine a preamble sequence based on the first coverage mode; the transceiver is configured to send the preamble sequence to a base station, where an index number of the preamble sequence is used to indicate the first coverage mode; and the memory is configured to store a program, the first coverage mode, and the preamble sequence.

A sixth aspect of this application provides a base station, including:

a transceiver, a memory, a processor, and a bus, where the transceiver, the memory, and the processor are connected by using the bus; the transceiver is configured to receive a preamble sequence sent by a terminal, where the preamble sequence is used to indicate a first coverage mode, and the first coverage mode is used to indicate a coverage mode required by the terminal; the processor is configured to determine the first coverage mode based on an index number of the preamble sequence; and the memory is configured to store a program, the first coverage mode, and the preamble sequence.

Another aspect of this application provides a computer readable storage medium. The computer readable storage medium stores an instruction. When the instruction runs on a computer, the computer performs the methods in the foregoing aspects.

It can be seen from the foregoing technical solutions that the embodiments of the present invention have the following advantages:

The terminal determines the first coverage mode, the terminal determines the preamble sequence based on the first coverage mode, and the terminal sends the preamble sequence to the base station. The preamble sequence is used to determine the first coverage mode. Because the base station can determine the coverage mode of the terminal by using only the preamble sequence sent by the terminal, without using a channel used to receive a signal of the terminal, resources do not need to be grouped or planned, and there is no need to strictly distinguish between different coverage mode sets or groups. Therefore, channel resources can be multiplexed, thereby improving channel resource utilization, and reducing channel resource scheduling complexity.

DESCRIPTION OF EMBODIMENTS

Embodiments of the present invention provide a coverage mode identification method and an apparatus, which are used by a base station to identify a coverage mode of a terminal based on a preamble sequence.

To make a person skilled in the art better understand the technical solutions in the embodiments of the present invention, the following clearly describes the technical solutions in the embodiments of the present invention with reference to the accompanying drawings in the embodiments of the present invention. Apparently, the described embodiments are merely some but not all of the embodiments of the present invention.

In the specification, claims, and accompanying drawings of the present invention, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
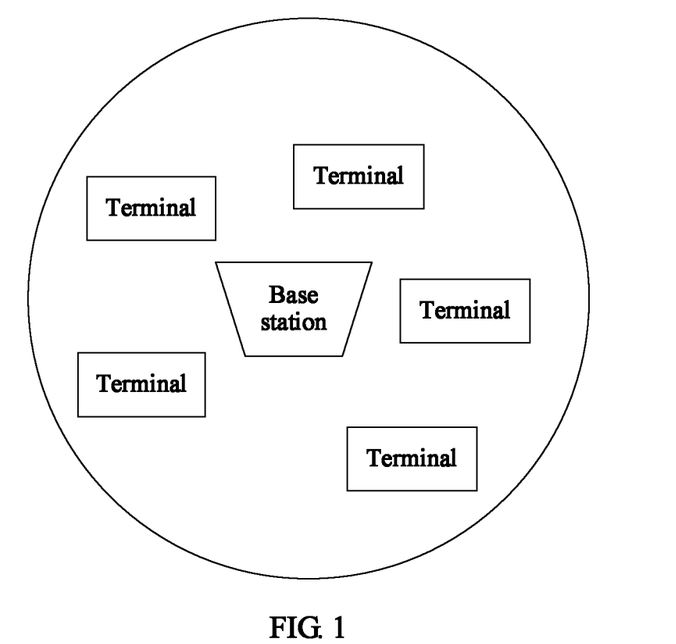
FIG. 1 is a schematic diagram of an architecture of a communications system according to an embodiment of this application.

Referring to FIG. 1, FIG. 1 shows an architecture of a communications system according to an embodiment of this application. The communications system includes a base station and a terminal.

In this embodiment of this application, the base station, namely, a public mobile communications base station, is a form of a radio station, and is a radio transceiver station that performs information transfer with a mobile phone terminal in a specific radio coverage area by using a mobile communication switching center.

In this embodiment of this application, the terminal may be any terminal device including a mobile phone, a tablet computer, a PDA (Personal Digital Assistant, personal digital assistant), a POS (Point of Sale, point of sale), an in-vehicle computer, and the like. A structure of the terminal is described by using an example of the mobile phone, and includes components such as a radio frequency (Radio Frequency, RF) circuit, a memory, an input unit, a display unit, a sensor, an audio frequency circuit, a Wireless Fidelity (wireless fidelity, WiFi) module, a processor, and a power supply. A person skilled in the art may understand that the structure of the mobile phone imposes no limitation on the mobile phone, and the mobile phone may include more or fewer components than those shown in the figure, or combine some components, or have different component arrangements.

In this embodiment of this application, one base station may serve one or more cells. The cell is also referred to as a cellular cell, and is an area covered by a same base station in a cellular mobile communications system. The terminal may communicate with the base station in the area by using a radio channel. In some feasible embodiments, the cell may alternatively be a sector. This is not limited herein.

When the communications system is applied to a scenario such as a harbor, a wharf, and an automated production flow, user equipment usually features relatively high mobility, and during movement of the user equipment, a radio signal sent by the base station is prone to be blocked by various objects between the user equipment and the base station. Consequently, quality of the radio signal is relatively poor. Alternatively, there is a relatively large quantity of user equipments, and during movement, radio signals of the user equipments are prone to be blocked by each other. Consequently, the user equipment may be unable to normally receive data sent by the base station. In this case, there is a high requirement for quality of a signal delivered by the base station, and the base station needs to provide a better radio coverage capability to respond to a scenario of relatively poor radio signal quality.

To respond to such a scenario, there are many different "coverage mode" scenarios, and it is required that the base station can identify, in a timely manner, a "coverage mode" required by the terminal, so as to perform different processing, and better serve a cell user. Therefore, an "enhanced coverage mode" is introduced, and different signal coverage capabilities are graded. To distinguish between and identify signal coverage capabilities required by terminals accessing a cell, channel resources are planned together, to respectively map to different coverage modes. Coverage modes of the terminals are distinguished from each other by using resources occupied by the terminals, so that different processing is performed, based on different coverage modes, on the terminals in the different coverage modes. However, in the method, channel resources corresponding to different coverage modes cannot be multiplexed, and the resources need to be grouped and planned, to strictly distinguish between different coverage mode sets or groups. Consequently, channel resource utilization is reduced, and channel resource scheduling complexity is increased.

Therefore, in the present invention, the terminal determines a first coverage mode, the terminal determines a preamble sequence based on the first coverage mode, and the terminal sends the preamble sequence to the base station. An index number of the preamble sequence is used to indicate the first coverage mode. Because the base station can determine the coverage mode of the terminal by using only the preamble sequence sent by the terminal, without using a channel used to receive a signal of the terminal, resources do not need to be grouped or planned, and there is no need to strictly distinguish between different coverage mode sets or groups. Therefore, channel resources can be multiplexed, thereby improving channel resource utilization, and reducing channel resource scheduling complexity.

Figure 2:
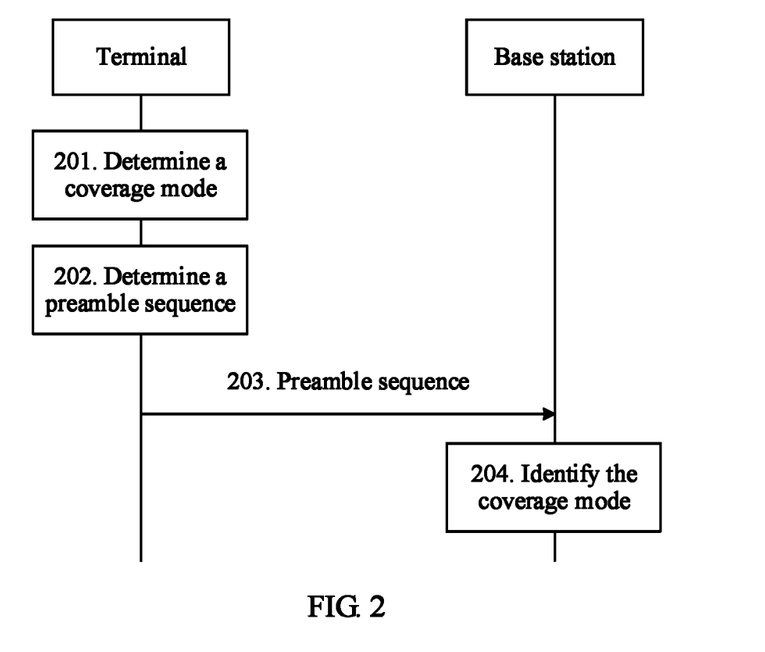
FIG. 2 is a schematic diagram of an embodiment of a coverage mode identification method according to an embodiment of this application.

For ease of understanding, a specific procedure in the embodiments of this application is described below. Referring to FIG. 2, an embodiment of a coverage mode identification method according to an embodiment of this application includes the following steps.

201. A terminal determines a first coverage mode.

In this embodiment of the present invention, the terminal and a base station may first implement synchronization before communicating with each other. Specifically, the terminal first searches for a primary synchronization signal (Primary Synchronization Signal, PSS) and/or a secondary synchronization signal (Secondary Synchronization Signal, SSS), and then parses a master information block (Master Information Block, MIB) and/or a system information block (System Information Blocks, SIB), until the terminal and the base station are connected and exchange information with each other, so that the terminal may be served by the base station when the terminal is in a serving area of the base station.

In this embodiment of the present invention, if the base station sends a broadcast signal in the serving area, when receiving the broadcast signal of the base station, the terminal may determine, based on strength of the received broadcast signal, the first coverage mode required by the terminal. Specifically, the first coverage mode may be an enhanced coverage mode or a normal coverage mode. It should be noted that the first coverage mode may further include different levels such as 1/2/3/4 . . . . This is not limited herein. Herein, an example in which the first coverage mode is the enhanced coverage mode and the normal coverage mode is used for description.

In this embodiment of the present invention, when the terminal needs to determine the first coverage mode of the terminal, the terminal may first receive a preset reference signal received power range sent by the base station. It should be noted that the preset reference signal received power range may be received by the terminal from the base station in a process of synchronizing the terminal and the base station, or may be actively sent by the base station to the terminal after the terminal and the base station are connected, or may be obtained by the terminal by sending a request to the base station when the terminal needs the preset reference signal received power range. This is not limited herein. In addition, the preset reference signal received power range may include one threshold. A value greater than or equal to the threshold or a value greater than the threshold is considered to fall within the preset reference signal received power range. A value less than the threshold or a value less than or equal to the threshold may be considered to fall out of the preset reference signal received power range. For example, if the threshold is a, all values greater than or equal to a fall within the preset reference signal received power range, and all values less than a fall out of the preset reference signal received power range. Alternatively, all values greater than a fall within the preset reference signal received power range, and all values less than or equal to a fall out of the preset reference signal received power range. This is not limited herein.

In some other feasible embodiments, the preset reference signal received power range may include two values, for example, a and b. If a value falls within a range of (a, b), (a, b], [a, b), or [a, b], it may be considered that the value falls within the preset reference signal received power range. If a value falls out of the range of (a, b), (a, b], [a, b), or [a, b], it may be considered that the value falls out of the preset reference signal received power range. This is not limited herein.

The preset reference signal received power range is used by the terminal to determine the required first coverage mode, and the terminal may first detect reference signal received power (Reference Signal Received Power, RSRP) of a signal from the base station. It should be noted that there is no time sequence relationship between steps, performed by the terminal, of receiving the preset reference signal received power range and detecting the reference signal received power of the signal from the base station. To be specific, the terminal may receive the preset reference signal received power range before detecting the reference signal received power of the signal from the base station or after detecting the reference signal received power of the signal from the base station. This is not limited herein.

It should be noted that in LTE and MF systems, the RSRP is a key parameter that may represent radio signal strength and is one of physical layer measurement requirements, and is an average power value of signals received on all resource elements in a symbol that carry a reference signal.

In this embodiment of the present invention, the example in which the first coverage mode is the enhanced coverage mode and the normal coverage mode is used. It may be considered that if the reference signal received power falls within the preset reference signal received power range, the terminal determines that the first coverage mode is the normal coverage mode; or that if the reference signal received power falls out of the preset reference signal received power range, the terminal determines that the first coverage mode is the enhanced coverage mode.

202. The terminal determines a preamble sequence based on the first coverage mode.

In this embodiment of the present invention, after determining the first coverage mode, the terminal may determine the corresponding preamble sequence based on the first coverage mode.

In some feasible embodiments, a "root sequence" may be predefined to support a specific quantity of users who use the preamble sequence (which are referred to as preamble sequence users below). It should be noted that a preamble sequence format is related to an occupied channel resource (Interlace), a root sequence, an orthogonal cover code (orthogonal cover code, OCC), and a cyclic shift parameter (Ncs).

It should be noted that the "root sequence" is a sequence used to generate a preamble sequence. The interlace is an uplink resource allocation unit in the MF system. One interlace includes 10 PRBs (physical resource block), and the 10 PRBs are distributed evenly on system bandwidth. 20 MHz and 100 PRBs are used as an example. An interlace 0 includes 10 PRBs, namely, PRB 0, PRB 10, PRB 20, . . . , and PRB 90. An interlace 1 includes 10 PRBs, namely, PRB 1, PRB 11, PRB 21, . . . , and PRB 91. The OCC and the Ncs are respectively used to perform a masking operation and a cyclic offset operation on the root sequence, to generate different preamble sequences. In the MF system, there are four types of available OCCs, and an available type of cyclic offset is calculated based on an Ncs configuration: 12/Ncs.

In this embodiment of the present invention, after the Ncs is defined, a quantity of preamble sequence users who can be supported by one "root sequence" by occupying one interlace may be defined as 4*12/Ncs. If there is no limitation on an interlace resource, an interlace is added, until 64 users can be supported; or if there is a limitation on an interlace resource, a new "root sequence" is added, until 64 users can be supported.

In some feasible implementations, for different Ncs configurations and interlace configurations, required quantities of root sequences and required quantities of preamble sequences that can be supported are shown in the following table:

| Ncs | Quantity of root sequences; quantity of preamble sequences that can be supported | |
|---|---|---|
| | One interlace | Two interlaces |
| 1 | 2; 96 | 1; 96 |
| 2 | 3; 72 | 2; 72 |
| 3 | 4; 64 | 2; 64 |
| 4 | 5; 70 | 3; 72 |
| 6 | 8; 64 | 4; 64 |
| 12 | 16; 64 | 8; 64 |

To align with LTE, the MF system defines only the first 64 preamble sequences in preamble sequences. As shown in the foregoing table, for a configuration of Ncs=1/2/4, a quantity of supported preamble sequence users is greater than 64 (96/72/70). However, only the first 64 preamble sequences are defined in a standard, and preamble sequences that are after the 64 preamble sequences and that are referred to as "redundant" preamble sequences are not defined in the current standard. When there is one interlace, if Ncs=1/2/4, there are respectively 32/8/6 redundant preamble sequences. When there are two interlaces, if Ncs=1/2/4, there are respectively 32/8/8 redundant preamble sequences. For all other Ncs configurations, there are 0 redundant preamble sequence. Herein, the preamble sequences that are not defined in the standard may be defined as preamble sequences used by an "enhanced coverage user", so that the base station may identify an "enhanced coverage mode" of the user in a user access process. For details, refer to the following table:

| | Index number of a preamble sequence | |
|---|---|---|
| Ncs | Normal coverage mode | Enhanced coverage mode |
| 1 | 0 to 63 | 64 to 95 |
| 2 | 0 to 63 | 64 to 71 |
| 3 | 0 to 63 | — |
| 4 | 0 to 63 | 64 to 69 |
| 6 | 0 to 63 | — |
| 12 | 0 to 63 | — |

When two interlaces are configured in the system, reference may be made to the following table:

| | Index number of a preamble sequence | |
|---|---|---|
| Ncs | Normal coverage mode | Enhanced coverage mode |
| 1 | 0 to 63 | 64 to 95 |
| 2 | 0 to 63 | 64 to 71 |
| 3 | 0 to 63 | — |
| 4 | 0 to 63 | 64 to 71 |
| 6 | 0 to 63 | — |
| 12 | 0 to 63 | — |

In this way, preamble sequences that respectively support the "normal coverage mode" and the "enhanced coverage mode" are defined by using the defined interlace and a corresponding root index. It should be noted that the preamble sequence is corresponding to an index number. A correspondence between the preamble sequence and the index number is preconfigured, or is notified by the base station to the terminal by using a broadcast channel. The preconfiguration is stipulated in the standard or a protocol. Specifically, the index number of the preamble sequence is used to determine the first coverage mode.

In this embodiment of the present invention, when the terminal needs the normal coverage mode, preamble sequences whose index numbers are 0 to 63 may be selected as a preamble sequence group. When the terminal needs the enhanced coverage mode, and the Ncs is 1, preamble sequences whose index numbers are 64 to 95 may be selected as a preamble sequence group. It should be noted that, based on the foregoing table, when the Ncs is 3/6/12, and there are two interlaces, there are 64 preamble sequence users who can be supported, and therefore there is no redundant user. In this case, a preamble sequence in the "enhanced coverage mode" is not supported. Therefore, the terminal may select one preamble sequence from the preamble sequence group as the preamble sequence.

In the foregoing table example, only when Ncs=1/2/4, there is a redundant preamble sequence that can be used by a user in the "enhanced coverage mode", and therefore there is large constraint. Therefore, in some other feasible embodiments, to improve this situation, for each Ncs configuration, a quantity of users supported by a preamble sequence supported by the Ncs configuration is extended to 96. For details, refer to the following table:

| Ncs | Quantity of root sequences; quantity of preamble sequences that can be supported | |
|---|---|---|
| | One interlace | Two interlaces |
| 1 | 2; 64 + 32 | 1; 64 + 32 |
| 2 | 3 + 1; 64 + 32 | 2; 64 + 32 |
| 3 | 4 + 2; 64 + 32 | 2 + 1; 64 + 32 |

-continued

| | Quantity of root sequences; quantity of preamble sequences that can be supported | |
|---|---|---|
| Ncs | One interlace | Two interlaces |
| 4 | 5 + 3; 64 + 32 | 3 + 1; 64 + 32 |
| 6 | 8 + 2; 64 + 32 | 4 + 2; 64 + 32 |
| 12 | 16 + 8; 64 + 32 | 8 + 4; 64 + 32 |

Except a case of Ncs=1, all other cases, that is, Ncs=2/3/4/6/12 cause an increase in "a quantity of used root sequences". For Ncs=2/3/4/6/12, when a quantity of interlaces configured in the system is 1, increased quantities of used "root sequences" are respectively 1/2/3/2/8; and when two interlaces are configured in the system, increased quantities of used "root sequences" are respectively 0/1/1/2/4.

For the first coverage mode corresponding to the preamble sequence in all Ncs configurations, refer to the following table:

| | Index number of a preamble sequence | |
|---|---|---|
| Ncs | Normal coverage mode | Enhanced coverage mode |
| 1/2/3/4/6/12 | 0 to 63 | 64 to 95 |

In this way, there is a redundant preamble sequence for each possible value of the Ncs, to support a preamble sequence user in the "enhanced coverage mode" in using the redundant preamble sequence.

It should be noted that in addition to the foregoing two methods for defining the "root sequence", there may be another method, provided that a redundant preamble sequence can be generated to support the preamble sequence user in the "enhanced coverage mode". This is not limited herein.

In some feasible embodiments, the terminal may not only determine the corresponding preamble sequence from a preset protocol based on the first coverage mode, but also receive system information broadcast by the base station, and then determine the preamble sequence based on the system information and the first coverage mode. This is not limited herein.

For example, the system information may carry the following information to indicate a preamble sequence group corresponding to the "enhanced coverage mode":
sizeOfRA-PreamblesGroupCE ENUMERATED {n4, n8, n12, n16, n20, n24, n28, n32}, where
n4 indicates that there are four available preamble sequences in the preamble sequence group corresponding to the enhanced coverage mode, and corresponding index numbers of the preamble sequences are 64 to 67; n8 indicates that there are eight available preamble sequences in the preamble sequence group corresponding to the enhanced coverage mode, and corresponding index numbers of the preamble sequences are 64 to 71, and so on.

For example, the system information may carry the following information to indicate a preamble sequence group corresponding to the "enhanced coverage mode":
sizeOfRA-PreamblesGroupCE ENUMERATED {n4, n8, n12, n16, n20, n24, n28, n32, n64}, where n4 indicates that there are four available preamble sequences in the preamble sequence group corresponding to the enhanced coverage mode, and corresponding index numbers of the preamble sequences are x to x+3; n8 indicates that there are eight available preamble sequences in the preamble sequence group corresponding to the enhanced coverage mode, and corresponding index numbers of the preamble sequences are x to x+7, and so on; and x represents a start index number of the preamble sequence in the preamble sequence group, and may be a preset value, such as 64, or may be determined by using the system information. For example, in existing system information, the following parameters are configured: numberOfRA-Preambles ENUMERATED {n4, n8, n12, n16, n20, n24, n28, n32, n36, n40, n44, n48, n52, n56, n60, n64}, and the value of x may be numberOfRA-Preambles.

203. The terminal sends the preamble sequence to a base station, where the preamble sequence is used to determine the first coverage mode.

In this embodiment of the present invention, after determining the preamble sequence, the terminal may send the preamble sequence to the base station. In this embodiment of the present invention, the terminal may determine a channel resource based on the channel resource configuration information, and then send the preamble sequence to the base station by using the channel resource. Specifically, the channel resource configuration information includes subframe information, frequency domain resource information, and a root sequence index that are of a channel. This is not limited herein.

204. The base station determines the first coverage mode based on the preamble sequence.

In this embodiment of the present invention, the base station receives the preamble sequence sent by the terminal, and the base station determines, based on the preamble sequence, an index number corresponding to the preamble sequence. The base station determines the first coverage mode of the terminal based on the index number, without using a channel used to receive a signal of the terminal. Therefore, the channel resource can be multiplexed, thereby reducing resource consumption.

Figure 3:
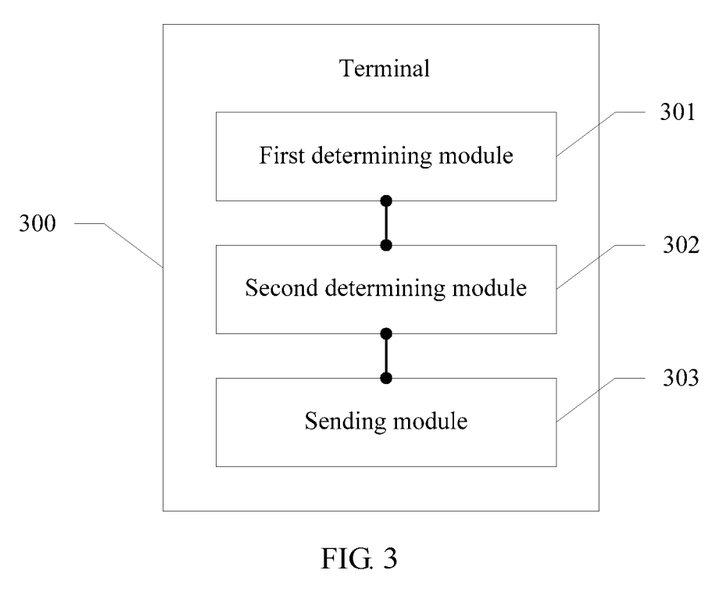
FIG. 3 is a schematic diagram of an embodiment of a terminal according to an embodiment of this application.

Referring to FIG. 3, FIG. 3 shows a terminal 300 according to an embodiment of the present invention, including:
a first determining module 301, configured to determine a first coverage mode; a second determining module 302, configured to determine a preamble sequence based on the first coverage mode; and
a sending module 303, configured to send the preamble sequence to a base station, where an index number of the preamble sequence is used to indicate the first coverage mode.

Figure 4:
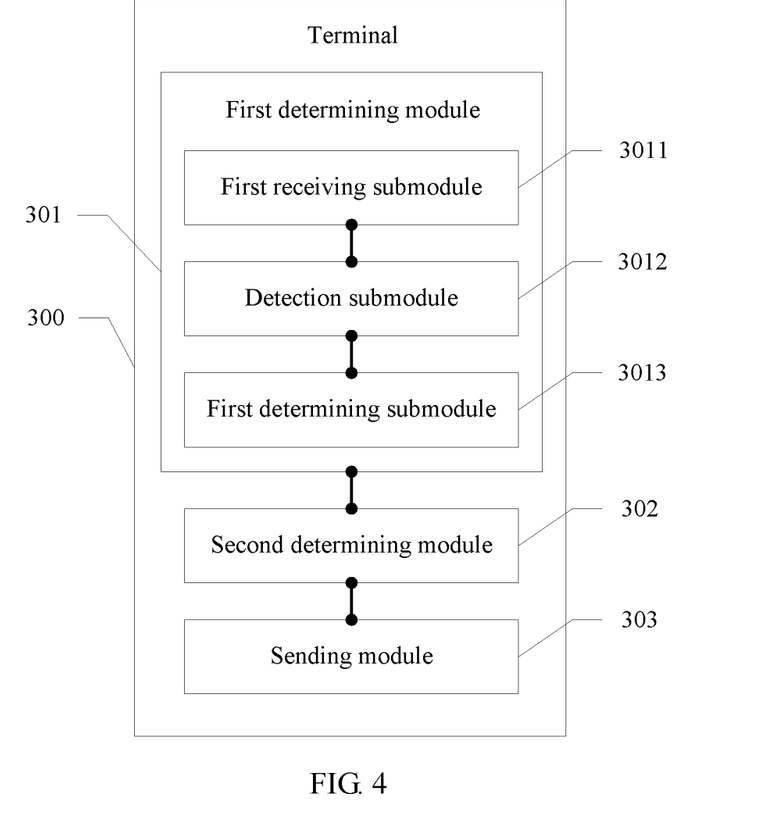
FIG. 4 is a schematic diagram of another embodiment of a terminal according to an embodiment of this application.

Referring to FIG. 4, the first determining module 301 includes:
a first receiving submodule 3011, configured to receive a preset reference signal received power range sent by the base station;
a detection submodule 3012, configured to detect reference signal received power of a signal from the base station; and
a first determining submodule 3013, configured to: if the reference signal received power falls within the preset reference signal received power range, determine that the first coverage mode is a normal coverage mode; or if the reference signal received power falls out of the preset reference signal received power range, determine that the first coverage mode is an enhanced coverage mode.

Figure 5:
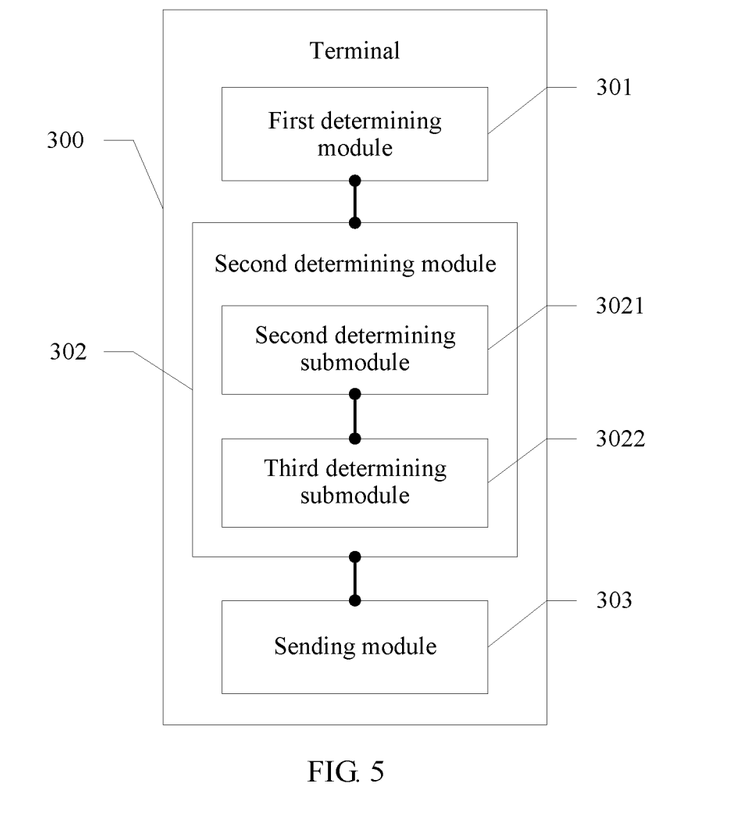
FIG. 5 is a schematic diagram of another embodiment of a terminal according to an embodiment of this application.

Referring to FIG. 5, the second determining module 302 includes:
a second determining submodule 3021, configured to determine a first preamble sequence group based on the first coverage mode; and a third determining submodule 3022, configured to determine the preamble sequence from the first preamble sequence group.

Figure 6:
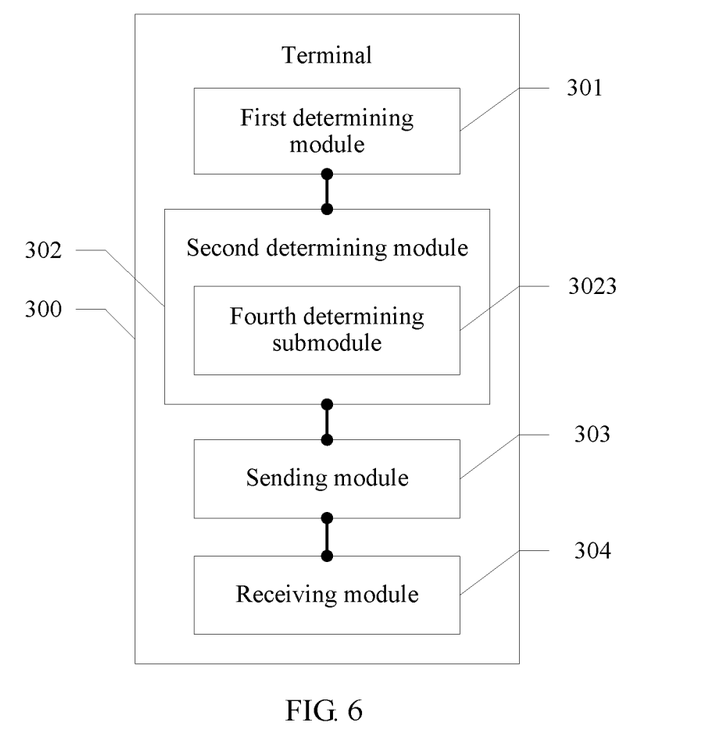
FIG. 6 is a schematic diagram of another embodiment of a terminal according to an embodiment of this application.

Referring to FIG. 6, the terminal includes:

a receiving module 304, configured to receive system information broadcast by the base station.

Referring to FIG. 6, the second determining module 302 includes:

a fourth determining submodule 3023, configured to determine the preamble sequence based on the system information and the first coverage mode.

Figure 7:
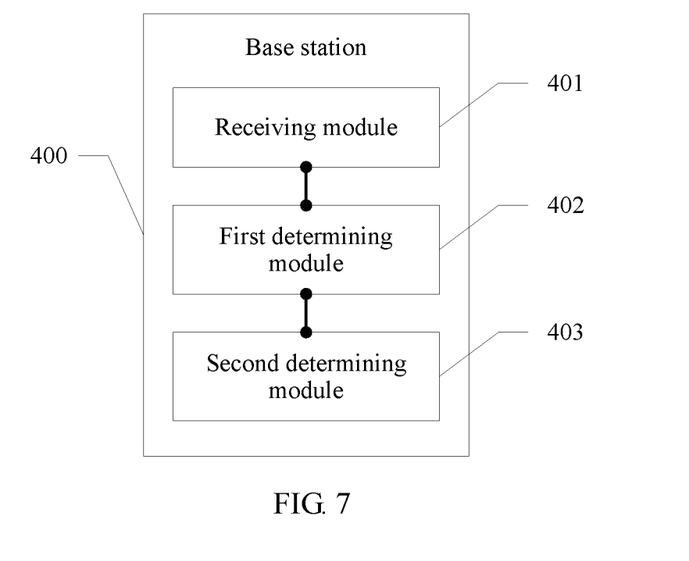
FIG. 7 is a schematic diagram of an embodiment of a base station according to an embodiment of this application.

Referring to FIG. 7, FIG. 7 is a base station 400 according to an embodiment of the present invention, including:

a receiving module 401, configured to receive a preamble sequence sent by a terminal, where the preamble sequence is used to indicate a first coverage mode, and the first coverage mode is used to indicate a coverage mode required by the terminal;

a first determining module 402, configured to determine, based on the preamble sequence, an index number corresponding to the preamble sequence; and a second determining module 403, configured to determine the first coverage mode of the terminal based on the index number.

Figure 8:
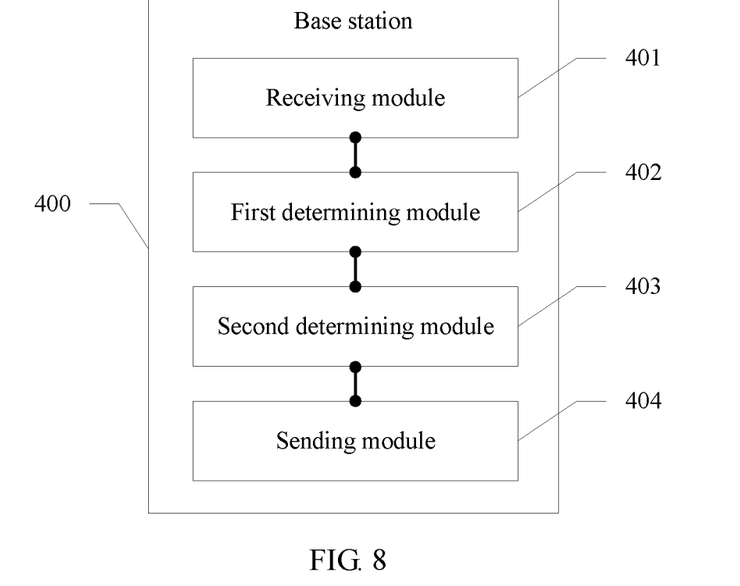
FIG. 8 is a schematic diagram of another embodiment of a base station according to an embodiment of this application.

Referring to FIG. 8, the base station 400 further includes:

a sending module 404, configured to send a preset reference signal received power range to the terminal, where the preset reference signal received power range is used by the terminal to determine the coverage mode.

Figure 9:
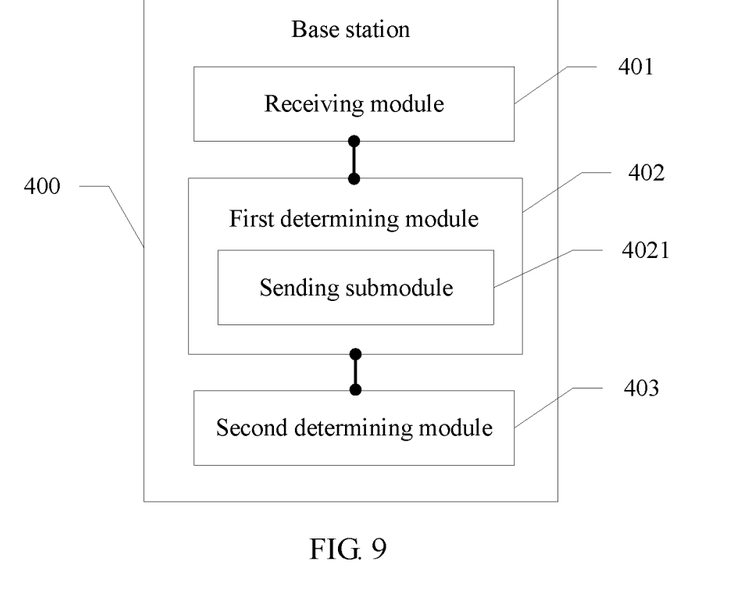
FIG. 9 is a schematic diagram of another embodiment of a base station according to an embodiment of this application.

Referring to FIG. 9, the first determining module 402 includes:

a sending submodule 4021, configured to send system information to the terminal, so that the terminal determines the preamble sequence based on the system information and the first coverage mode.

Figure 10:
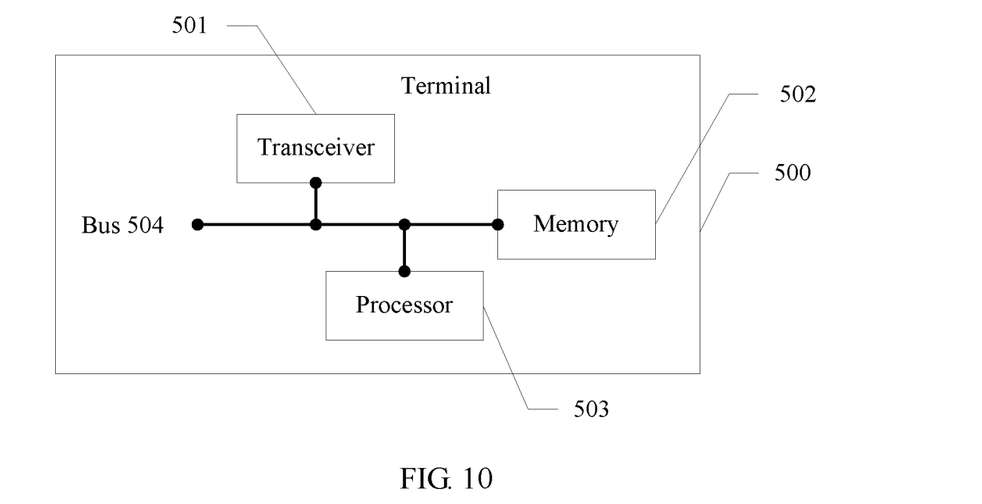
FIG. 10 is a schematic diagram of an embodiment of a terminal according to an embodiment of this application.

Referring to FIG. 10, FIG. 10 shows a terminal 500 according to an embodiment of the present invention, including:

a transceiver 501, a memory 502, a processor 503, and a bus 504.

The transceiver 501, the memory 502, and the processor 503 are connected by using the bus 504.

The processor 503 is configured to: determine a first coverage mode, and determine a preamble sequence based on the first coverage mode.

The processor 503 may be a central processing unit (English: central processing unit, CPU for short), a network processor (English: network processor, NP for short), or a combination of a CPU and an NP.

The processor 503 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logical device (English: complex programmable logical device, CPLD for short), a field-programmable gate array (English: field-programmable gate array, FPGA for short), generic array logic (English: generic array logic, GAL for short), or any combination thereof.

The transceiver 501 is configured to send the preamble sequence to a base station, where the preamble sequence is used to determine the first coverage mode.

The transceiver 501 may include a communications interface (English: communications interface) between the processor 503 and a standard communications subsystem.

The transceiver 501 may further include a communications interface in the EIA-RS-232C standard, namely, a communications interface in the serial binary data exchange interface technology standard between data terminal equipment (English: Data Terminal Equipment, DTE for short) and data circuit-terminating equipment (English: Data Circuit-terminating Equipment, DCE for short), or may include a communications interface in the RS-485 protocol. This is not limited herein.

The memory 502 is configured to store a program, the first coverage mode, and the preamble sequence.

The memory 502 may include a volatile memory (English: volatile memory), for example, a random access memory (English: random-access memory, RAM for short). Alternatively, the memory 502 may include a nonvolatile memory (English: non-volatile memory), for example, a flash memory (English: flash memory), a hard disk drive (English: hard disk drive, HDD for short), or a solid state drive (English: solid-state drive, SSD for short). Alternatively, the memory 503 may include a combination of the foregoing types of memories. This is not limited herein.

Figure 11:
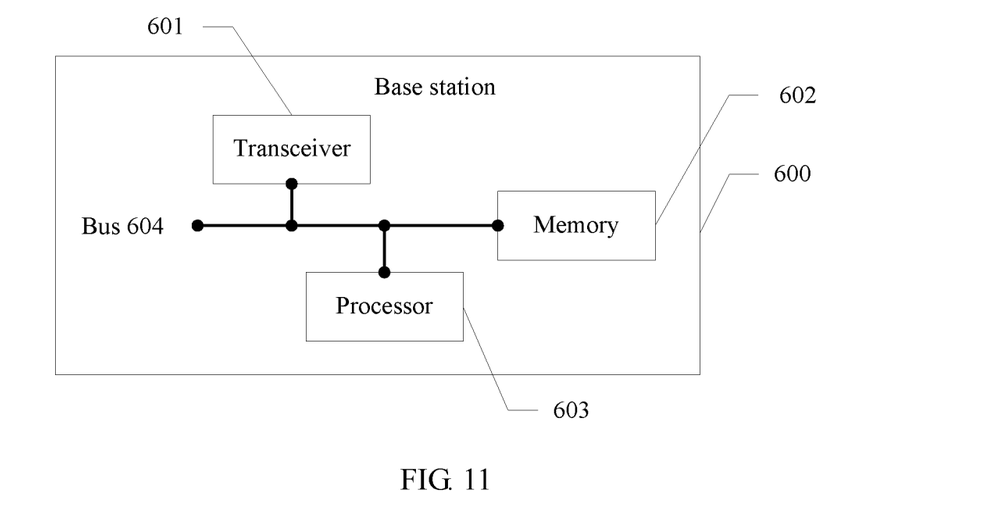
FIG. 11 is a schematic diagram of an embodiment of a base station according to an embodiment of this application.

Referring to FIG. 11, FIG. 11 shows a base station 600 according to an embodiment of the present invention, including:

a transceiver 601, a memory 602, a processor 603, and a bus 604.

The transceiver 601, the memory 602, and the processor are connected by using the bus.

The transceiver 601 is configured to receive a preamble sequence sent by a terminal, where the preamble sequence is used to indicate a first coverage mode, and the first coverage mode is used to indicate a coverage mode required by the terminal.

The processor 603 is configured to: determine, based on the preamble sequence, an index number corresponding to the preamble sequence, and determine the first coverage mode of the terminal based on the index number.

The memory 602 is configured to store a program, the first coverage mode, and the preamble sequence.

All or some of the foregoing embodiments may be implemented by software, hardware, firmware, or any combination thereof. When the software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
   determining, by a terminal, a coverage mode of the terminal is an enhanced coverage mode or a normal coverage mode;
   in response to determining that the coverage mode of the terminal is the enhanced coverage mode, determining, by the terminal, a preamble sequence from a first preamble sequence group, wherein the first preamble sequence group comprises preamble sequences whose index numbers are 64 to 95; or
   in response to determining that the coverage mode of the terminal is the normal coverage mode, determining, by the terminal, a preamble sequence from a second preamble sequence group, wherein the second preamble sequence group comprises preamble sequences whose index numbers are 0 to 63; and
   sending, by the terminal, the preamble sequence to a base station.

2. The method according to claim 1, wherein the determining, by a terminal, a coverage mode of the terminal is an enhanced coverage mode or a normal coverage mode comprises:
   receiving, by the terminal, a preset reference signal received power range from the base station;
   detecting, by the terminal, reference signal received power of a signal from the base station; and
   in response to detecting that the reference signal received power falls within the preset reference signal received power range, determining, by the terminal, that the coverage mode of the terminal is the normal coverage mode;
   in response to detecting that the reference signal received power falls out of the preset reference signal received power range, determining, by the terminal, that the coverage mode of the terminal is the enhanced coverage mode.

3. The method according to claim 1, wherein a cyclic shift parameter of the preamble sequence is 1, 2, 3, 4, 6 or 12.

4. A method, comprising:
   receiving, by a base station, a preamble sequence from a terminal; and
   determining, by the base station, a coverage mode of the terminal is an enhanced coverage mode or a normal coverage mode based on the preamble sequence, wherein in response to which the preamble sequence is contained in a first preamble sequence group, the coverage mode of the terminal is determined to be an enhanced coverage mode, wherein index numbers of preamble sequences in the first preamble sequence group are 64 to 95; or
   in response to which the preamble sequence is contained in a second preamble sequence group, the coverage mode of the terminal is determined to be the normal coverage mod; wherein index numbers of preamble sequences in the second preamble sequence group are 0 to 63.

5. The method according to claim 4, wherein the determining, by the base station, a coverage mode of the terminal is an enhanced coverage mode or a normal coverage mode based on the preamble sequence comprises:
   determining, by the base station based on the preamble sequence, an index number corresponding to the preamble sequence; and
   determining, by the base station, the coverage mode of the terminal based on the index number.

6. The method according to claim 4, wherein a cyclic shift parameter of the preamble sequence is 1, 2, 3, 4, 6, or 12.

7. The method according to claim 4, wherein before the receiving, by a base station, a preamble sequence from a terminal, the method further comprising:

sending, by the base station, a preset reference signal received power range to the terminal.

8. An apparatus, comprising:

a transceiver;

at least one processor; and a computer-readable storage medium storing a program to be executed by the at least one processor, the program including instructions to:

determine a coverage mode of a terminal is an enhanced coverage mode or a normal coverage mode;

in response to determining that the coverage mode of the terminal is the enhanced coverage mode, determining a preamble sequence from a first preamble sequence group, wherein the first preamble sequence group comprises preamble sequences whose index numbers are 64 to 95; or in response to determining that the coverage mode of the terminal is the normal coverage mode, determining a preamble sequence from a second preamble sequence group, wherein the second preamble sequence group comprises preamble sequences whose index numbers are 0 to 63; and send the preamble sequence to a base station.

9. The apparatus according to claim 8, wherein the program further including instructions to:

receive a preset reference signal received power range from the base station;

detect reference signal received power of a signal from the base station; and in response to detecting that the reference signal received power falls within the preset reference signal received power range, determine that the coverage mode of the terminal is a normal coverage mode;

in response to detecting that the reference signal received power falls out of the preset reference signal received power range, determine that the coverage mode of the terminal is an enhanced coverage mode.

10. The apparatus according to claim 8, wherein a cyclic shift parameter of the preamble sequence is 1, 2, 3, 4, 6 or 12.

11. An apparatus, comprising:

a transceiver;

at least one processor; and a non-transitory computer-readable storage medium storing a program to be executed by the at least one processor, the program including instructions to:

receive a preamble sequence from a terminal; and determine a coverage mode of the terminal is an enhanced coverage mode or a normal coverage mode based on the preamble sequence, wherein the coverage mode of the terminal is the enhanced coverage mode when the preamble sequence is contained in a first preamble sequence group, wherein index numbers of preamble sequences in the first preamble sequence group are 64 to 95, or wherein the coverage mode of the terminal is the normal coverage mode when the preamble sequence is contained in a second preamble sequence group, and wherein index numbers of preamble sequences in the second preamble sequence group are 0 to 63.

12. The apparatus according to claim 11, wherein a cyclic shift parameter of the preamble sequence is 1, 2, 3, 4, 6 or 12.

13. The apparatus according to claim 11, the program further comprising instructions to:

send a preset reference signal received power range to the terminal.

14. The apparatus according to claim 11, the program further comprising instructions to:

determine an index number of the preamble sequence; and determine the coverage mode of the terminal is an enhanced coverage mode or a normal coverage mode based on the index number.

* * * * *

UNITED STATES PATENT AND TRADEMARK OFFICE
CERTIFICATE OF CORRECTION

| | | |
|---|---|---|
| PATENT NO. | : 11,134,498 B2 | Page 1 of 1 |
| APPLICATION NO. | : 16/657636 | |
| DATED | : September 28, 2021 | |
| INVENTOR(S) | : Zhanyang Ren et al. | |

It is certified that error appears in the above-identified patent and that said Letters Patent is hereby corrected as shown below:

In the Claims

Column 16 Line 54 Claim 4, delete "mod;" and insert -- mode, --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*